(12) United States Patent
Chen et al.

(10) Patent No.: US 8,773,424 B2
(45) Date of Patent: Jul. 8, 2014

(54) USER INTERFACES FOR INTERACTING WITH TOP-DOWN MAPS OF RECONSTRUCTED 3-D SCENCES

(75) Inventors: Billy Chen, Bellevue, WA (US); Eyal Ofek, Redmond, WA (US); Gonzalo Alberto Ramos, Bellevue, WA (US); Jonathan Robert Dughi, Bainbridge Island, WA (US); David Maxwell Gedye, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 12/699,904

(22) Filed: Feb. 4, 2010

(65) Prior Publication Data

US 2011/0187716 A1 Aug. 4, 2011

(51) Int. Cl.
*G06T 15/00* (2011.01)

(52) U.S. Cl.
USPC .......................................... 345/419; 345/619

(58) Field of Classification Search
None
See application file for complete search history.

(56) References Cited

U.S. PATENT DOCUMENTS

| | | | |
|---|---|---|---|
| 6,212,420 B1 | 4/2001 | Wang et al. | |
| 6,324,469 B1 | 11/2001 | Okude et al. | |
| 6,571,024 B1 | 5/2003 | Sawhney et al. | |
| 6,619,406 B1 * | 9/2003 | Kacyra et al. | 172/4.5 |
| 6,639,594 B2 | 10/2003 | Zhang et al. | |
| 6,760,027 B2 | 7/2004 | Endo et al. | |
| 7,148,892 B2 | 12/2006 | Robertson et al. | |
| 7,386,394 B2 | 6/2008 | Shulman | |
| 2002/0076085 A1 * | 6/2002 | Shimazu | 382/100 |
| 2004/0085335 A1 | 5/2004 | Burlnyk et al. | |
| 2004/0125138 A1 * | 7/2004 | Jetha et al. | 345/764 |
| 2005/0134945 A1 | 6/2005 | Gallagher | |
| 2005/0156945 A1 * | 7/2005 | Asami | 345/619 |
| 2006/0132482 A1 | 6/2006 | Oh | |
| 2008/0221843 A1 | 9/2008 | Shenkar et al. | |
| 2008/0222558 A1 | 9/2008 | Cho et al. | |
| 2008/0246759 A1 | 10/2008 | Summers | |
| 2008/0247636 A1 | 10/2008 | Davis et al. | |
| 2008/0268876 A1 | 10/2008 | Gelfand et al. | |
| 2008/0291217 A1 | 11/2008 | Vincent et al. | |
| 2009/0002394 A1 | 1/2009 | Chen et al. | |
| 2009/0237510 A1 | 9/2009 | Chen et al. | |

FOREIGN PATENT DOCUMENTS

WO   WO 2009/089125   7/2009

OTHER PUBLICATIONS

U.S. Official Action dated Sep. 19, 2012 I U.S. Appl. No. 12/699,896.
U.S. Official Action dated Jun. 21, 2012 in U.S. Appl. No. 12/699,902.

(Continued)

*Primary Examiner* — Said Broome
(74) *Attorney, Agent, or Firm* — Steven Spellman; Jim Ross; Micky Minhas

(57) ABSTRACT

Technologies are described herein for providing user interfaces through which a user may interact with a top-down map of a reconstructed structure within a 3-D scene. An application provides one or more user interfaces allowing a user to select a camera pose, a reconstruction element, a point, or a group of points on the top-down map. The application then determines at least one representative photograph from the visual reconstruction based on the selection of the user, and the displays a preview of the representative photograph on the top-down map as a thumbnail image. The provided user interfaces may further allow the user to navigate to the representative photograph in the local-navigation display of the visual reconstruction.

19 Claims, 11 Drawing Sheets

(56) References Cited

OTHER PUBLICATIONS

"Genesis IV Tutorial: Getting Started—The Main Window," Oct. 5, 2009, Retrieved from http://www.geomantics.com/tutorial01.htm, 1 pp.

Hachet et al. "3D Panorama Service on Mobile Device for Hiking," Apr. 28-May 3, 2007, Retrieved at http://msLftw.aUpapers/6_hachet.pdf, CHI Workshop 2007, San Jose, USA, pp. 1-4.

Hogue et al. "Underwater Environment Reconstruction using Stereo and Inertial Data", Oct. 7-10, 2007, IEEE International Conference on Systems, Man and Cybernetics, 6 pp.

Koch et al. "3D Reconstruction and Rendering from Image Sequences", 2005, *WIAMIS 05*, Retrieved at http://www.ist-matris.org/publicaitons/WIAMIS-Reconstruction.pdf, pp. 4.

Matsumoto et al. "Visual Navigation Using Omnidirectional View Sequence," 1999, Proceedings of the 1999 IEEE/RSJ International Conference on Intelligent Robots and Systems, vol. 1., pp. 317-322.

Oskam et al. "Visibility Transition Planning for Dynamic Camera Control," 2009, Eurographics/ACM SIGGRAPH Symposium on Computer Animation, pp. 47-57.

Terzopoulos et al. "Dynamic 3D Models with local and Gobal Deformations: Deformable Superquadrics", Jul. 1991, IEEE Transactions on Pattern Analysis and Machine Intelligence, 13(7): 703-714.

Wulf, et al. "Colored 2D Maps for Robot Navigation with 3D Sensor Data", Sep. 28-Oct. 2, 2004, IEEE/RSJ International Conference on Intelligent Robots and Systems, 6 pp.

Wulf, et al. "2D Mapping of Cluttered Indoor Environments by Means of 3D Perception," Apr. 2004, Proceedings of the 2004 IEEE International Conference on Robotics & Automation, New Orleans, LA, pp. 4204-4209.

Zitnick et al. "High-Quality Video View Interpolation Using a Layered Representation", Aug. 2004, Proceedings of ACM SIGGRAPH 2004, 23(3): 600-608.

U.S. Official Action dated Mar. 12, 2013 in U.S. Appl. No. 12/699,896.
U.S. Official Action dated Dec. 14, 2012 in U.S. Appl. No. 12/699,902.
U.S. Official Action dated Apr. 5, 2013 in U.S. Appl. No. 12/699,902.
U.S. Notice of Allowance dated Jul. 16, 2013 in U.S. Appl. No. 12/699,896.
U.S. Official Action dated Sep. 18, 2013 in U.S. Appl. No. 12/699,902.

Chen et al. "A Virtual Environment System for the Comparison of Dome and HMD System", 2003, Proceedings of the International Conference on Computer Graphics and Spatial Information Systems, pp. 50-58, Feb. 2003.

Sudarsanam et al. "Non-linear Perspective Widges for Creating Multiple-View Images", 2008Retrieved at http://www.cs.wustl.edu/-cmg/contentlpapers/npar2008npar2008np/npar2008np.pdf, Proceedings of the 6th International Symposium on Non-Photrealistic Animation and Rendering, ACM, 9 pp, Jun. 2008.

Kang, et al. "Smooth Scene Transition for Virtual Tour on the World Wide Web", Retrieved at<<http://ieeexplore.ieee.org/stamp/stamp.jsp?arnumber=1540728&isnumber=32901>>, Proceedings of the Sixth International Conference on Computational Intelligence and Multimedia Applications (ICCIMA'5), 2005 IEEE, pp. 6, Aug. 2005.

Sudarsanam, et al. "Non-linear Perspective Widgets for Creating Multiple-View Images", Retrieved at<<http://www.cs.wustl.edu/~cmp/content/papers/npar2008np/npar2008np.pdf>>, pp. 9, Jun. 2008.

Chen, et al. "A Virtual Environment System for the Comparison of Dome and HMD Systems", Retrieved at<<http://www.cs.brown.edu/~jchen/publications/ICCG&SIS-191.pdf>>, pp. 9, Aug. 2002.

U.S. Official Action dated Jan. 17, 2014 in U.S. Appl. No. 12/699,902.

\* cited by examiner

USER INTERFACES FOR INTERACTING WITH TOP-DOWN MAPS OF RECONSTRUCTED 3-D SCENCES

BACKGROUND

Using the processing power of computers, it is possible to create a visual reconstruction of a scene or structure from a collection of digital photographs ("photographs") of the scene. The reconstruction may consist of the various perspectives provided by the photographs coupled with a group of three-dimensional ("3-D") points computed from the photographs. The 3-D points may be computed by locating common features, such as objects or edges, in a number of the photographs, and using the position, perspective, and visibility or obscurity of the features in each photograph to determine a 3-D position of the feature. The visualization of 3-D points computed for the collection of photographs is referred to as a "3-D point cloud." For example, given a collection of photographs of a cathedral from several points of view, a 3-D point cloud may be computed that represents the cathedral's geometry. The 3-D point cloud may be utilized to enhance the visualization of the cathedral's structure when viewing the various photographs in the collection.

Current applications may allow a user to navigate a visual reconstruction by moving from one photograph to nearby photographs within the view. For example, to move to a nearby photograph, the user may select a highlighted outline or "quad" representing the nearby photograph within the view. This may result in the view of the scene and accompanying structures being changed to the perspective of the camera position, or "pose," corresponding to the selected photograph in reference to the 3-D point cloud. This form of navigation is referred to as "local navigation."

Local navigation, however, may be challenging for a user. First, photographs that are not locally accessible or shown as a quad within the view may be difficult to discover. Second, after exploring a reconstruction, the user may not retain an understanding of the environment or spatial context of the captured scene. For example, the user may not appreciate the size of a structure captured in the reconstruction or have a sense of which aspects of the overall scene have been explored. Furthermore, since the photographs likely do not sample the scene at a regular rate, a local navigation from one photograph to the next may result in a small spatial move or a large one, with the difference not being easily discernable by the user. This ambiguity may further reduce the ability of the user to track the global position and orientation of the current view of the reconstruction.

It is with respect to these considerations and others that the disclosure made herein is presented.

SUMMARY

Technologies are described herein for providing user interfaces through which a user may interact with a top-down map of a reconstructed structure within a 3-D scene. Utilizing the technologies described herein, a user may utilize a top-down map as an alternative means of navigating photographs within a visual reconstruction, thereby enhancing the user's understanding of the environment and spatial context of the scene while improving the discoverability of photographs not easily discovered through local navigation.

According to one embodiment, an application provides one or more user interface through which the user may select a camera pose, an object, a point, a group of points, or other elements on the top-down map. The application then determines at least one representative photograph from the visual reconstruction based on the selection of the user, and displays a preview of the representative photograph on the top-down map as a thumbnail image. The provided user interfaces may further allow a means to navigate to the representative photograph in the local-navigation display of the visual reconstruction.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing user interfaces through which a user may interact with a top-down map of a reconstructed structure within a 3-D scene. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
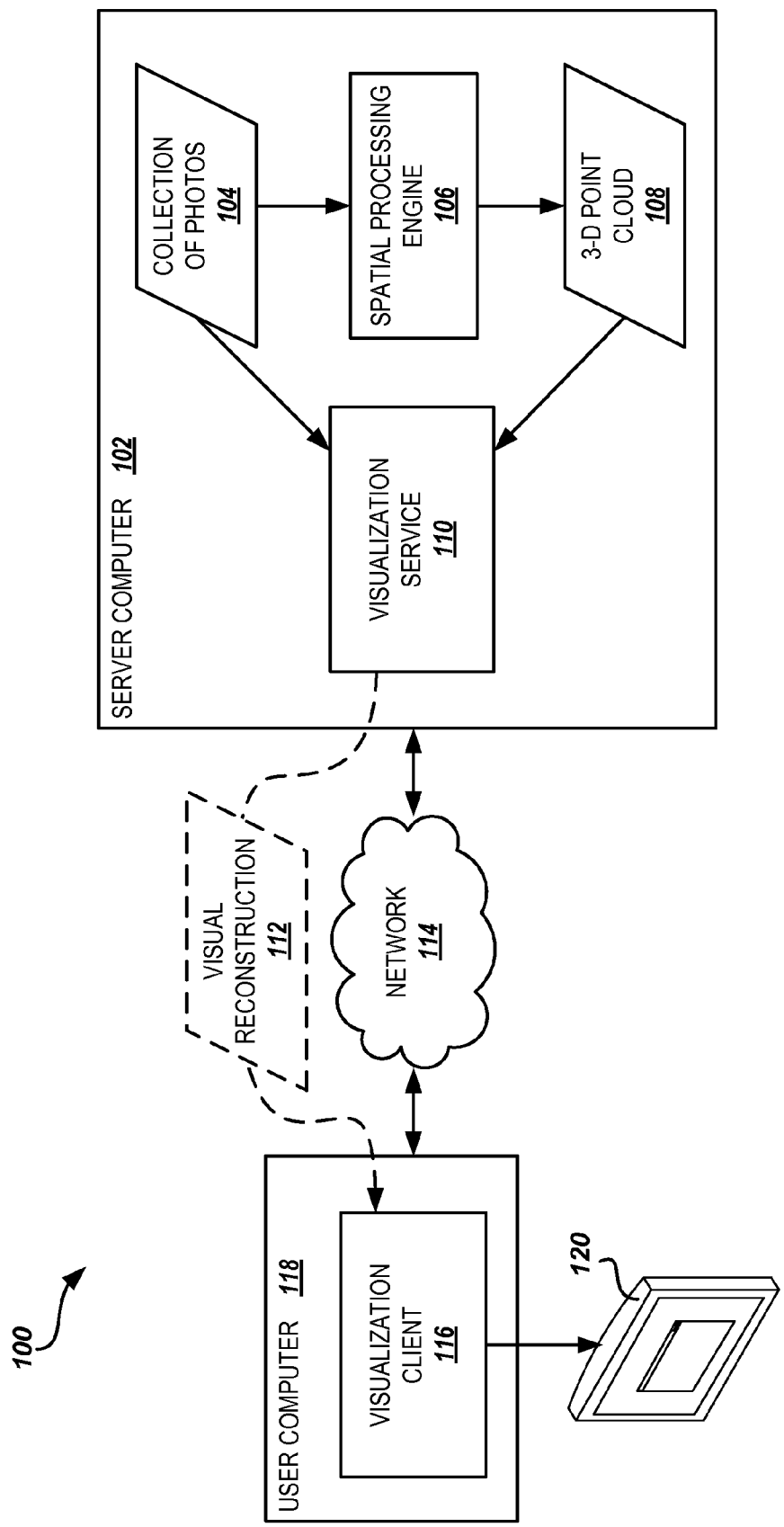
FIG. 1 is a block diagram showing aspects of an illustrative operating environment and several software components provided by the embodiments presented herein.

FIG. 1 shows an illustrative operating environment 100 including several software components for providing user interfaces allowing a user to interact with a top-down map of a reconstructed structure within a 3-D scene, according to embodiments provided herein. The environment 100 includes a server computer 102. The server computer 102 shown in FIG. 1 may represent one or more web servers, application servers, network appliances, dedicated computer hardware devices, personal computers ("PC"), or any combination of these and/or other computing devices known in the art.

According to one embodiment, the server computer 102 stores a collection of photographs 104. The collection of photographs 104 may consist of two or more digital photographs taken by a user of a particular structure or scene, or the collection of photographs may be an aggregation of several digital photographs taken by multiple photographers of the same scene, for example. The digital photographs in the collection of photographs 104 may be acquired using digital cameras, may be digitized from photographs taken with traditional film-based cameras, or may be a combination of both.

A spatial processing engine 106 executes on the server computer 102 and is responsible for computing a 3-D point cloud 108 representing the structure or scene from the collection of photographs 104. The spatial processing engine 106 may compute the 3-D point cloud 108 by locating recognizable features, such as objects or edges, that appear in two or more photographs in the collection of photographs 104, and calculating the position of the feature in space using the location, perspective, and visibility or obscurity of the features in each photograph. The spatial processing engine 106 may be implemented as hardware, software, or a combination of the two, and may include a number of application program modules and other components on the server computer 102.

A visualization service 110 executes on the server computer 102 that provides services for users to view and navigate visual reconstructions of the scene or structure captured in the collection of photographs 104. The visualization service 110 may be implemented as hardware, software, or a combination of the two, and may include a number of application program modules and other components on the server computer 102.

The visualization service 110 utilizes the collection of photographs 104 and the computed 3-D point cloud 108 to create a visual reconstruction 112 of the scene or structure, and serves the reconstruction over a network 114 to a visualization client 116 executing on a user computer 118. The user computer 118 may be a PC, a desktop workstation, a laptop, a notebook, a mobile device, a personal digital assistant ("PDA"), an application server, a Web server hosting Web-based application programs, or any other computing device. The network 114 may be a local-area network ("LAN"), a wide-area network ("WAN"), the Internet, or any other networking topology that connects the user computer 118 to the server computer 102. It will be appreciated that the server computer 102 and user computer 118 shown in FIG. 1 may represent the same computing device.

The visualization client 116 receives the visual reconstruction 112 from the visualization service 110 and displays the visual reconstruction to a user of the user computer 118 using a display device 120 attached to the computer. The visualization client 116 may be implemented as hardware, software, or a combination of the two, and may include a number of application program modules and other components on the user computer 118. In one embodiment, the visualization client 116 consists of a web browser application and a plug-in module that allows the user of the user computer 118 to view and navigate the visual reconstruction 112 served by the visualization service 110.

According to embodiments, the visual reconstruction 112 includes a top-down map generated from the 3-D point cloud 108. Generally, the top-down map is a two-dimensional view of the 3-D point cloud 108 from the top generated by projecting all the points of the 3-D point cloud 108 into a two-dimensional plane. The positions of the identifiable features, or points, computed in the 3-D point cloud 108 may be represented as dots in the top-down map. The points of the 3-D point cloud 108 shown in the top-down map may be filtered and/or enhanced to reduce the noise and enhance the top-down visualization, as described in co-pending U.S. patent application Ser. No. 12/699,902 filed concurrently herewith, and entitled "Generating and Displaying Top-Down Maps of Reconstructed 3-D Scenes," which is incorporated herein by reference in its entirety.

Figure 2:
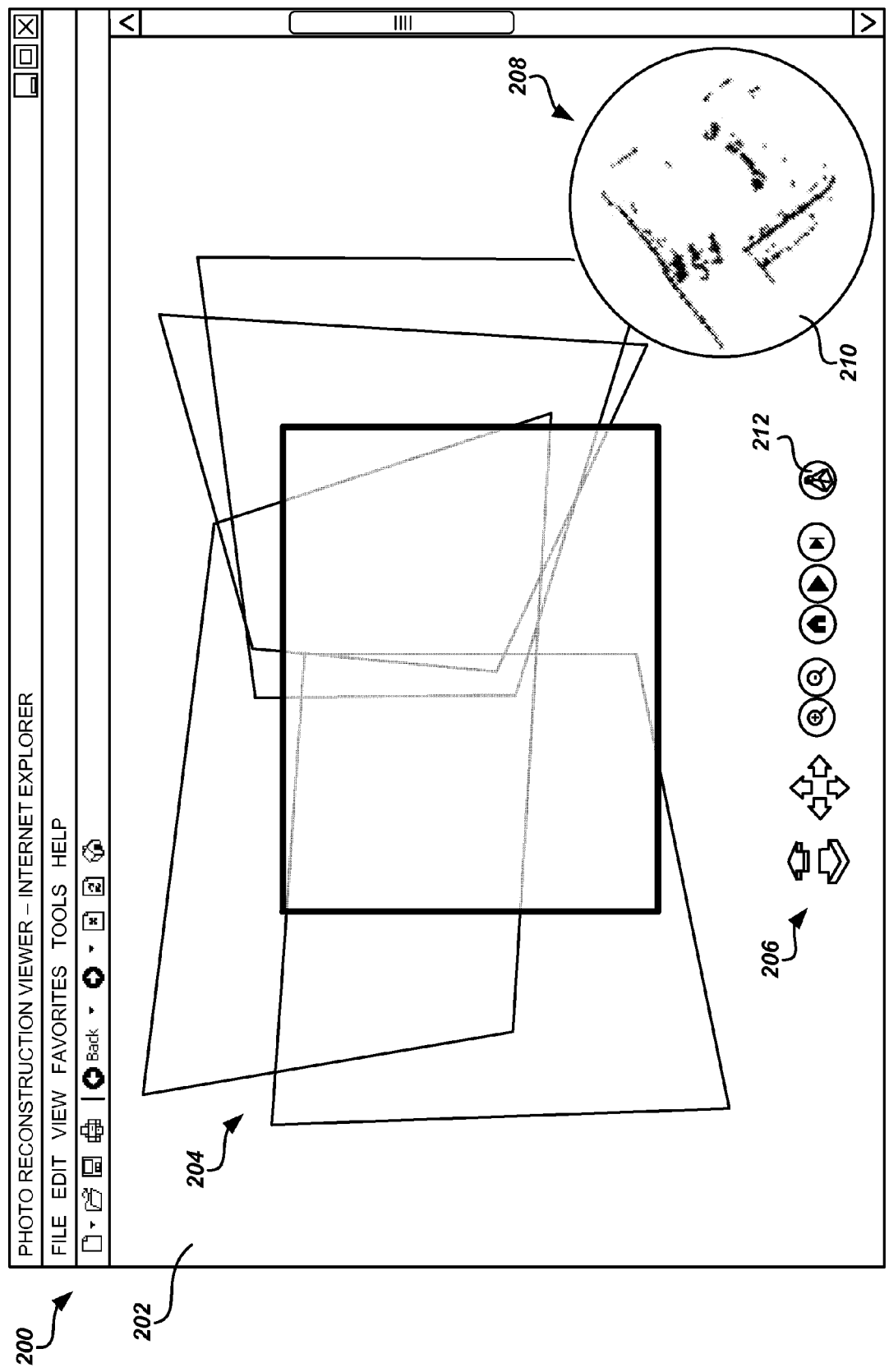
FIG. 2 is a display diagram showing an illustrative user interface for displaying a top-down map generated for a visual reconstruction, according to one embodiment presented herein.

FIG. 2 shows an example of an illustrative user interface 200 displayed on the display device 120 by the visualization client 116. The user interface 200 includes a window 202 in which a local-navigation display 204 is provided for navigating between the photographs in the visual reconstruction 112. The local-navigation display 204 may include a set of navigation controls 206 that allows the user to pan and zoom the photographs as well as move between them.

According to one embodiment, the user interface 200 also includes a top-down map 208 displayed in an inset window, or "mini-map" 210, in conjunction with the local-navigation display 204, as further shown in FIG. 2. The display of the mini-map 210 may be toggled by a particular control 212 in the navigation controls 206, for example. Alternatively, the window 202 may be split horizontally or vertically with the top-down map 208 displayed in one side of the split and the local-navigation display 204 in the other. The display of the top-down map 208 in conjunction with the local-navigation display 204 is referred to as the "split-screen view."

Figure 3:
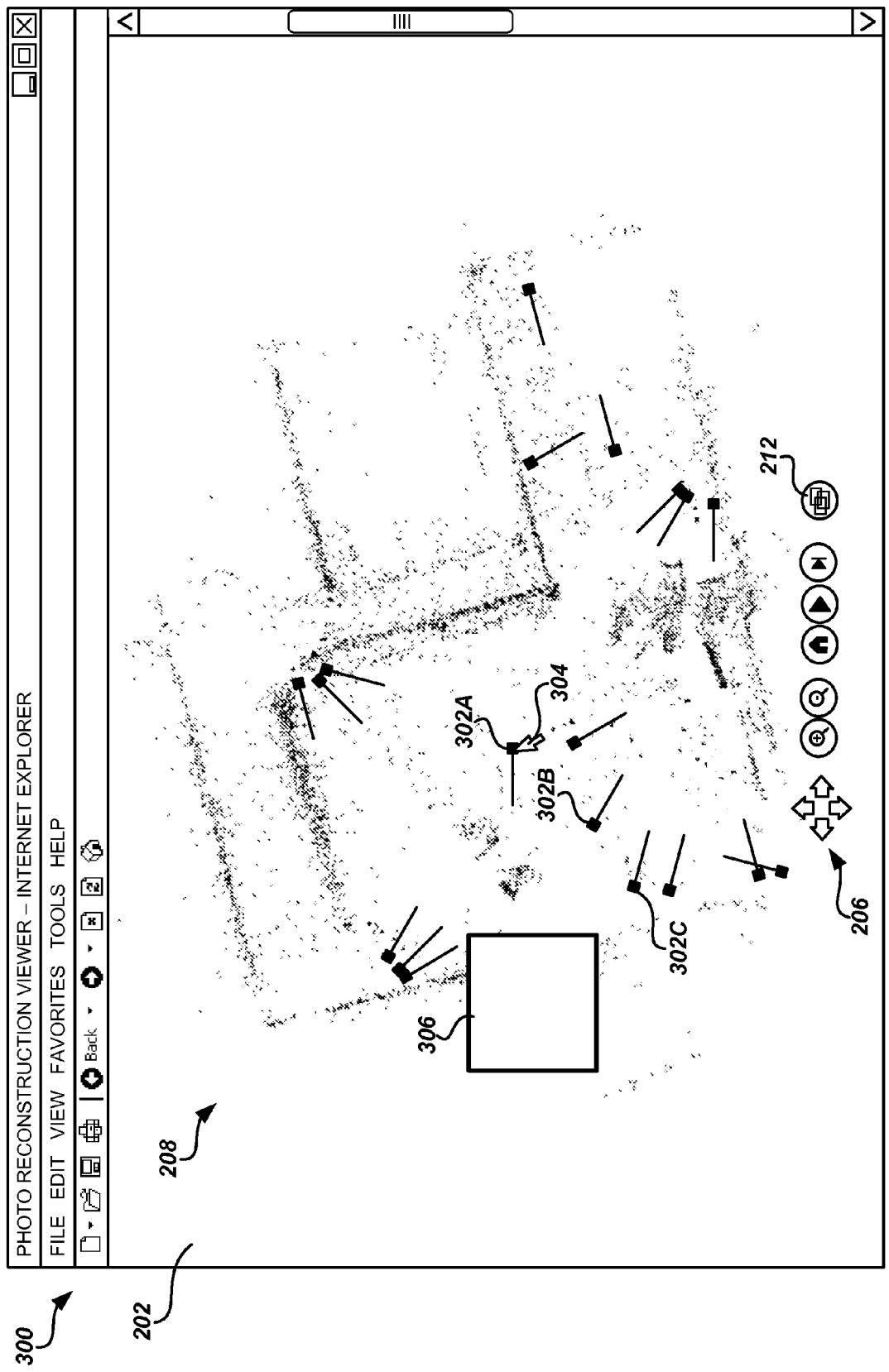
FIG. 3 is a display diagram showing another illustrative user interface for displaying the top-down map and providing camera-based interaction with the top-down map, according to one embodiment presented herein.

FIG. 3 shows another illustrative user interface 300 for displaying the top-down map 208 by the visualization client 116. In this example, the top-down map 208 is displayed separately from the local-navigation display 204. This view is referred to as the "modal view." The visualization client 116 may provide a similar set of navigation controls 206 as those described above that allows the user to pan and zoom the top-down map 208 to reveal the entire scene or structure represented in the visual reconstruction 112, or to see more detail of a particular section. The user may toggle back and forth between the modal view of the top-down map 208 and the local-navigation display 204 using the particular control 212 in the navigation controls 206, for example.

The visualization client 116 may provide a number of user interfaces allowing the user to interact with the top-down map 208. These interactions may include allowing the user to navigate the photographs shown in the local-navigation display 204 using the top-down map 208. User interactions may be divided into two categories: camera-based interactions and object-based interactions. In a camera-based interaction, the user specifies a target camera and the visualization client 116 determines the representative photograph in the visual reconstruction 112 to display in the local-navigation display 204 for the selected camera. In an object-based interaction, the user specifies an object, such as a point or group of points in the 3D point cloud 108, and the visualization client 116 determines the representative photograph in the visual reconstruction 112 for that object. The representative photograph may be a photograph from the collection of photographs 104 determined by the visualization client 116 to likely provide the best view-point of the selected camera or representation of the selected object.

According to one embodiment, the user interface 300 provides a camera-based interaction technique involving the selection of a particular camera from the top-down map 208. The visual reconstruction 112 may include the position and orientation of the camera, or "camera pose," for some or all of the photographs in the collection of photographs 104. The visualization client 116 may indicate the camera poses by displaying camera pose indicators on the top-down map 208, such as camera pose indicators 302A-302C (referred to herein generally as camera pose indicators 302) shown in FIG. 3. The camera pose indicators 302 show the position of the camera as well as the direction of the corresponding photograph. The camera pose indicators 302 may be displayed as vectors, view frusta, or any other graphic indicators.

The user interface 300 may further include a selection control 304 that allows the user to select a particular camera pose indicator 302. The selection control 304 may be a pointer, circle, square, or other iconic indicator that the user may move around the map using a mouse or other input device connected to the user computer 118. According to one embodiment, if the user hovers the selection control 304 over a particular camera pose indicator 302A, the visualization client 116 displays a thumbnail image 306 of the photograph in the visual reconstruction 112 corresponding to the selected camera pose indicator 302A on the top-down map 208. The position of the thumbnail image 306 on the top-down map 208 may be determined using a number of different techniques. For example, the thumbnail image 306 may be placed near the position of the camera that captured the corresponding photograph, or the thumbnail image may be placed at a position along a projected line in the direction of the camera view, as shown in FIG. 3.

If the user selects the camera pose indicator 302A, by clicking a button on the mouse, for example, the visualization client 116 displays the photograph corresponding to the selected camera in the local-navigation display 204. In a split-screen view, this may involve shifting the local-navigation display 204 to the position of the corresponding photograph within the visual reconstruction 112. In the modal view, this may require transitioning the display from the modal view of the top-down map 208 to the local-navigation display 204. This transition from modal view to local-navigation display 204 may be performed in such a way as to allow a user to retain a visual orientation of the camera position in the transition from one view to the other, as described in co-pending U.S. patent application Ser. No. 12/699,896 filed concurrently herewith, and entitled "Transitioning Between Top-Down Maps and Local Navigation of Reconstructed 3-D Scenes," which is incorporated herein by reference in its entirety.

Figure 4:
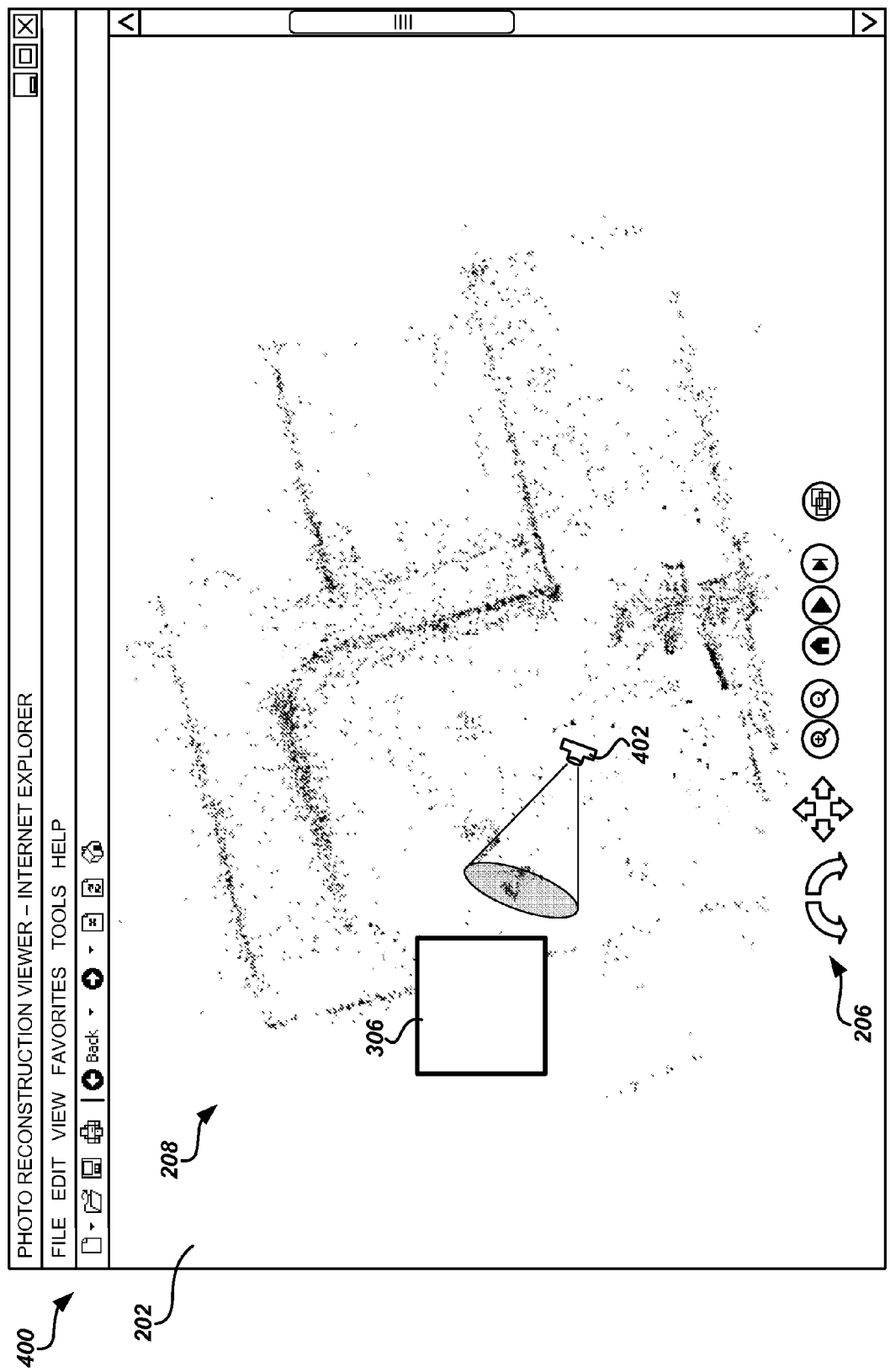
FIG. 4 is a display diagram showing another user interface for providing camera-based interaction with the top-down map, according to another embodiment presented herein.

FIG. 4 shows a further user interface 400 providing a camera-based interaction technique involving the selection of an ideal camera view on the top-down map 208, according to another embodiment. The visualization client 116 may allow the user to specify the ideal camera view by positioning a virtual camera control 402 on the top-down map 208 using a mouse and/or the set of navigation controls 206 displayed in the window 202. The virtual camera control 402 may relate the camera position, orientation, and field of view for the ideal camera view. The set of navigation controls 206 may contain additional controls to orient the virtual camera control 402 and adjust the field of view, for example.

As the virtual camera control 402 is moved around the top-down map 208, the visualization client 116 may determine the representative photograph in the visual reconstruction 112 based on the camera pose closest in position, orientation, and field of view to the virtual camera control. The visualization client 116 may display a thumbnail image 306 of the representative photograph at an appropriate position on the top-down map 208. In one embodiment, the thumbnail image 306 of the selected photograph is displayed only when the position, orientation, and field of view to the virtual camera control 402 in relation to the top-down map 208 fall within a specific range of the corresponding camera pose. The visualization client 116 may update the representative photograph selection and position of the thumbnail image 306 as the user moves or changes the orientation of the virtual camera control 402 on the top-down map 208. If the user selects an ideal camera view, by clicking a button on the mouse, for example, the visualization client 116 may display the representative photograph determined based on the current position, orientation, and field of view to the virtual camera control 402 in the local-navigation display 204.

Figure 5:
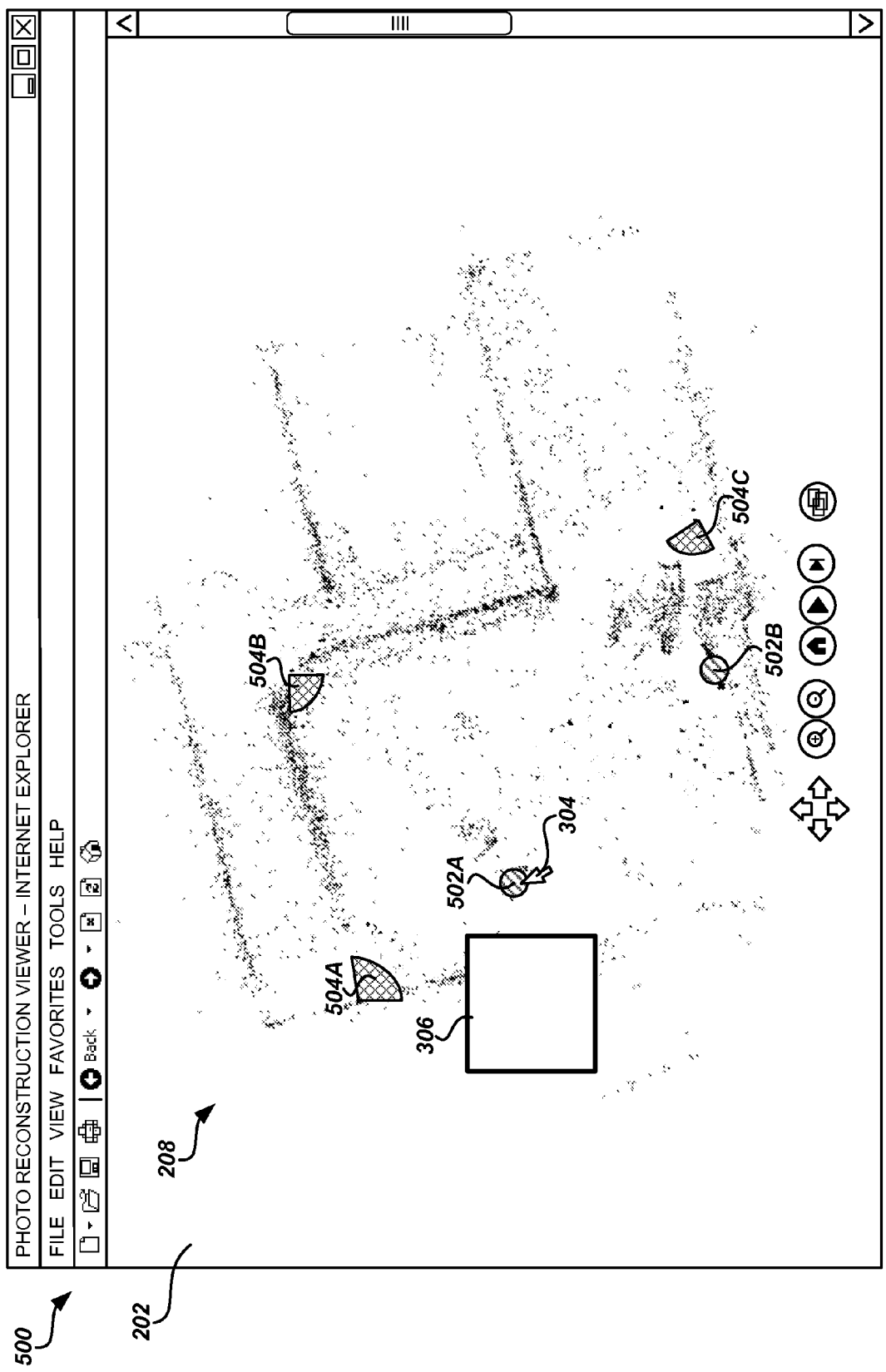
FIG. 5 is a display diagram showing an illustrative user interface for providing object-based interaction with the top-down map, according to one embodiment presented herein.

FIG. 5 shows a further user interface 500 providing an object-based interaction technique involving the selection of reconstruction elements overlaid on the top-down map 208. According to embodiments, the visual reconstruction 112 may include a number of reconstruction elements beyond the camera poses discussed above. These elements may include objects and panoramas. Objects identify features or structures in the visual reconstruction 112 that the user can "orbit" by navigating through a corresponding sequence of photographs. Objects may be identified by the visualization service 110 from a recognition of multiple angles of the object within the collection of photographs 104. Panoramas may be created when photographs corresponding to a number of camera poses can be stitched together to create a panoramic or wide-field view of the associated structure or scene in the visual reconstruction 112.

The visualization client 116 may display object indicators 502A-502B at the positions of the objects and panorama indicators 504A-504C at the position of the resulting panoramic view on the top-down map 208. The visual reconstruction 112 may further include a specification of a representative photograph for each reconstruction element displayed. For example, the visual reconstruction 112 may specify as the representative photograph for an object the photograph from the collection of photographs 104 containing the largest number of common features identified for the object. For a panorama, the visual reconstruction 112 may specify as the representative photograph the photograph covering the widest field of view from the panorama.

According to one embodiment, if the user hovers the selection control 304 over a particular reconstruction element displayed on the top-down map 208, such as the object indicator 502A shown in FIG. 5, the visualization client 116 displays a thumbnail image 306 of the representative photograph specified in the visual reconstruction 112 for the reconstruction element at an appropriate position on the top-down map. If the user selects the object indicator 502A, by clicking a button on the mouse, for example, the visualization client 116 displays the corresponding representative photograph in the local-navigation display 204.

Figure 6:
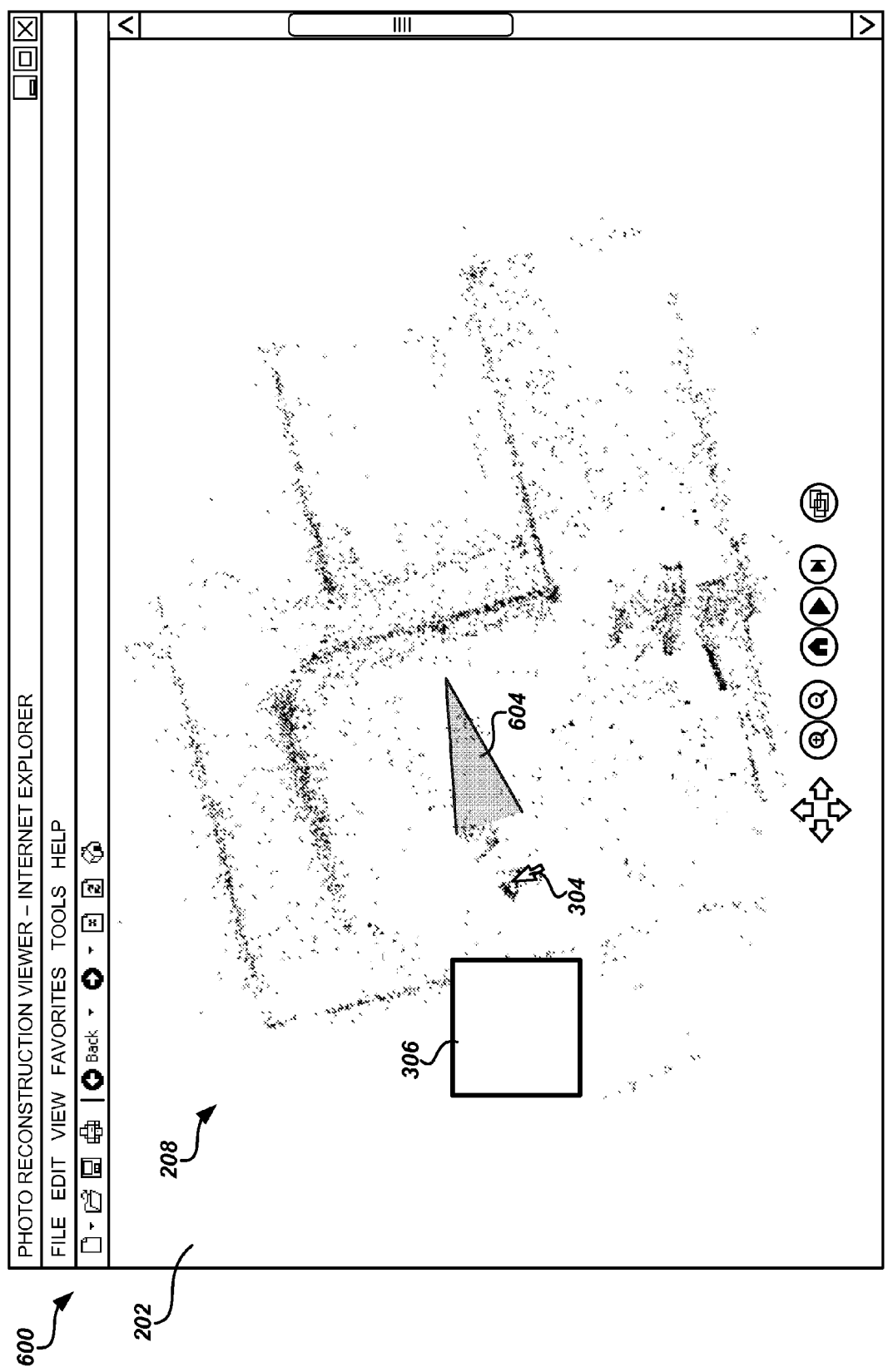
FIG. 6 is a display diagram showing another user interface for providing object-based interaction with the top-down map, according to another embodiment presented herein.

FIG. 6 shows a user interface 600 providing a further object-based interaction technique involving the selection of a point from the 3-D point cloud displayed in the top-down map 208. In one embodiment, when the user hovers the selection control 304 over a point on the top-down map 208, the visualization client 116 may display a thumbnail image 306 at an appropriate position on the corresponding map. The thumbnail image 306 may correspond to a photograph in the visual reconstruction 112 in which the feature corresponding to the selected point is visible. In addition to the thumbnail image 306, the visualization client 116 may further display a view frustum 604 or other indicator on the top-down map 208 that indicates the position and point-of-view of the camera that captured the photograph corresponding to the thumbnail image.

Figure 7:
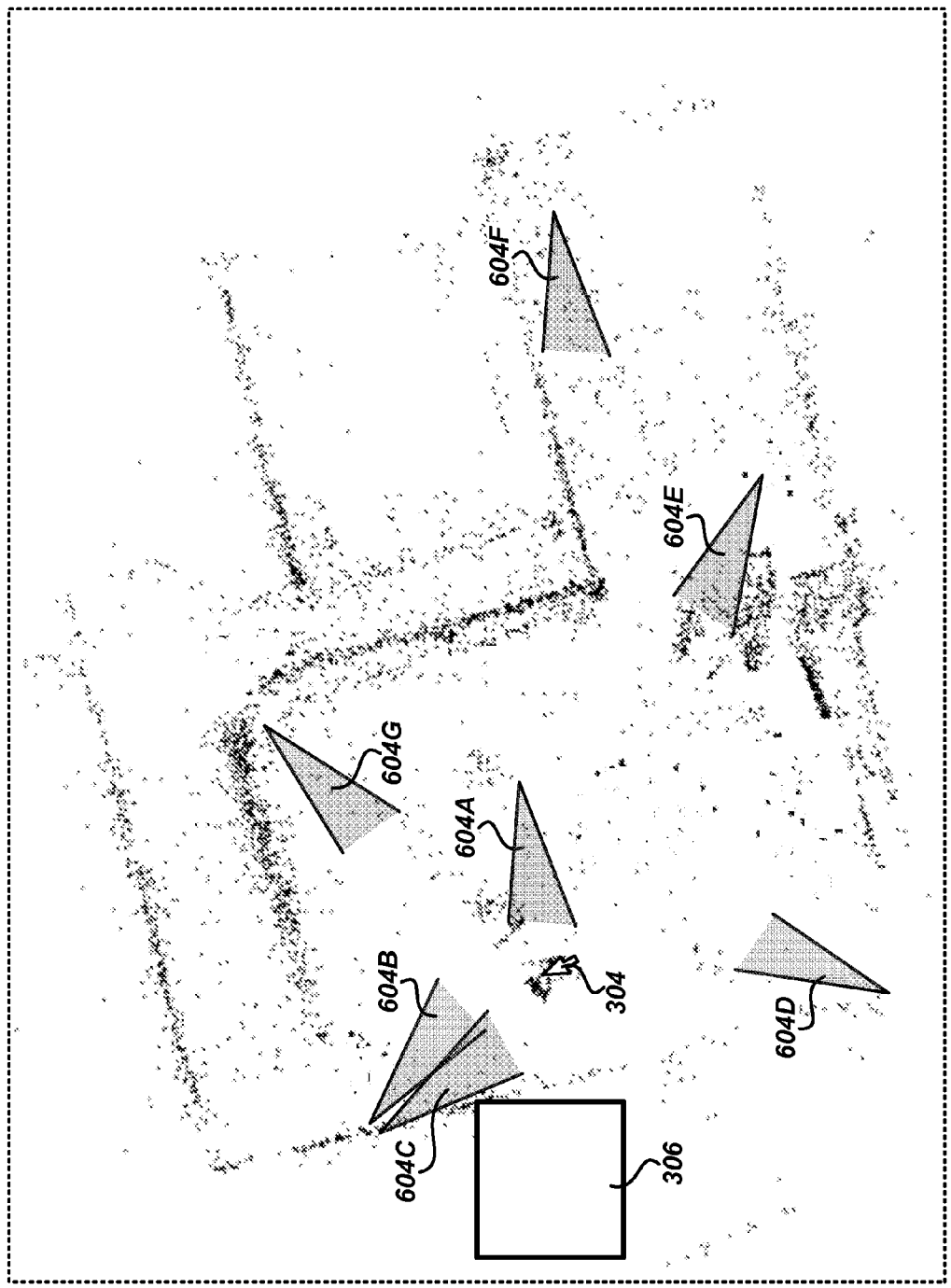
FIG. 7 is a diagram showing aspects of one algorithm for selecting a representative photograph based on a user selection, according to embodiments described herein.

It will be appreciated that multiple photographs in the visual reconstruction 112 may contain the feature corresponding to the selected point on the top-down map 208. For example, as shown in FIG. 7, photographs corresponding to view frustas 604A-604G include the selected point. According to one embodiment, the visualization client 116 may utilize an algorithm based on the proximity and view direction of the camera poses corresponding to the photographs containing the feature to determine the representative photograph for which to display the thumbnail image 306.

The visualization client 116 first excludes from selection those photographs that do not center on the selected point. The visualization client 116 does this by projecting the point on all camera poses and measuring the distance of this projected point to the center of the corresponding photograph image. If this distance is larger than a specific threshold, the visualization client 116 excludes the photograph from selection as the representative photograph. Returning to FIG. 7, the photographs corresponding to view frustas 604B-604D may be excluded by this procedure, for example.

From the remaining photographs containing the selected point, the visualization client 116 then examines the proximity of each camera pose to the selected point. The visualization client 116 selects the photograph corresponding to the camera pose closest to the selected point as the representative photograph and displays the associated thumbnail image 306. For example, from the remaining photographs corresponding to view frustas 604A and 604E-604G in FIG. 7, the visualization client 116 may select the photograph corresponding to view frustum 604A for which to display the thumbnail image 306. As described above, if the user selects the point under the selection control 304, by clicking a button on the mouse, for example, the visualization client 116 may further display the selected photograph in the local-navigation display 204.

Figure 8:
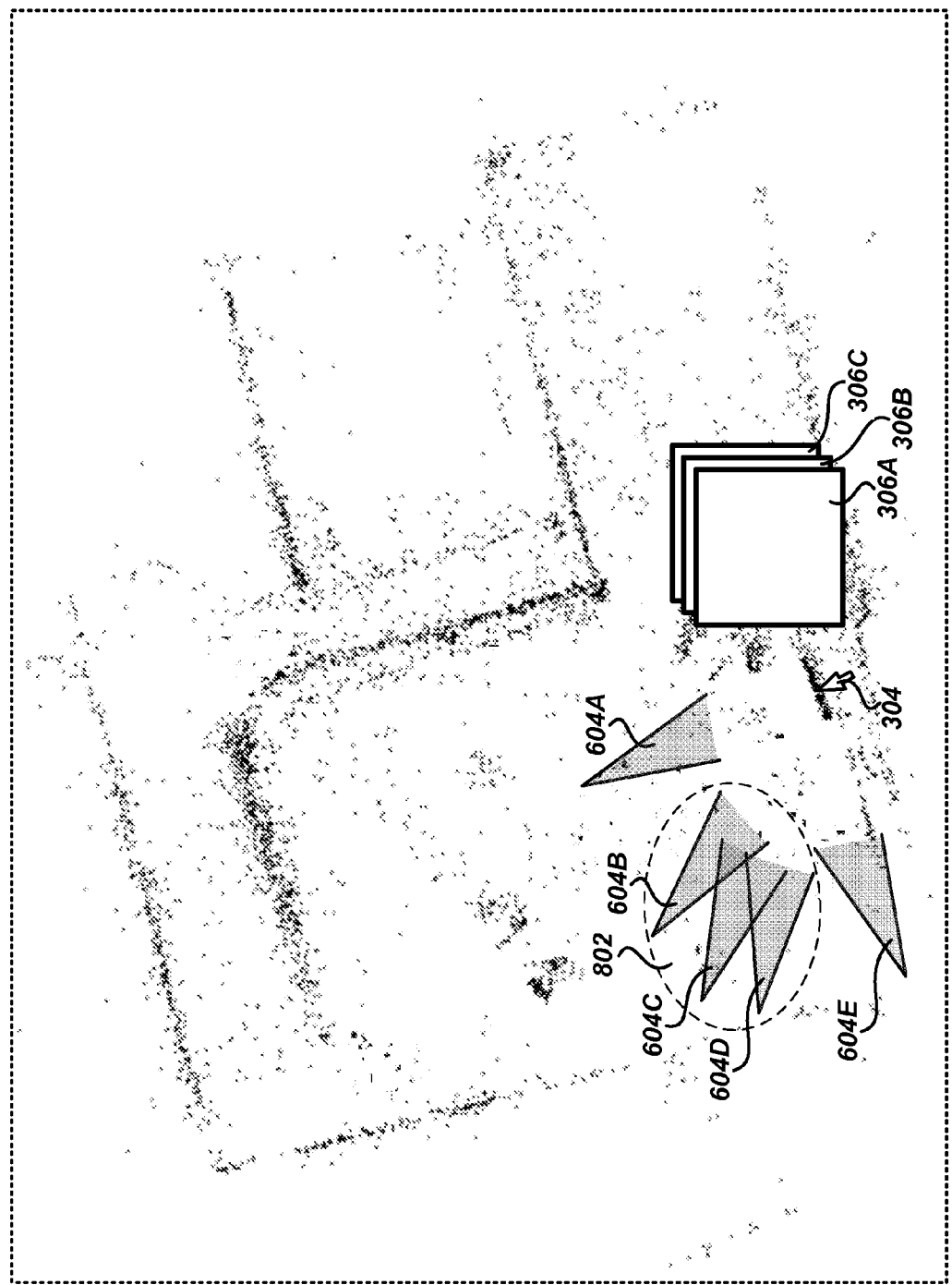
FIG. 8 is a diagram showing aspects of another algorithm for selecting a representative photograph based on a user selection, according to embodiments described herein.

FIG. 8 illustrates aspects of an alternative approach for determining the representative photograph from the photographs containing the selected point based on clusters of cameras, according to another embodiment. In this approach, the visualization client 116 first identifies all photographs in the visual reconstruction 112 in which the selected point is visible. Next, the visualization client 116 clusters the camera poses corresponding to the identified photographs based on their position and orientation. The clustering can be accomplished by finding camera poses within a specific threshold value of each other along n dimensions, where n is less than or equal to the six dimensions of x, y, z, roll, pitch, and yaw. Alternatively, the visualization client 116 may drop two dimensions for clustering the camera poses in the two-dimensional top-down map 208, e.g. z and pitch. For example, the visualization client 116 may cluster the camera poses corresponding to view frustas 604B-604D shown in FIG. 8 into one cluster 802 based on the similarities between the x, y position on the top-down map 208 of the camera poses as well as their similar orientations.

Once all the cameras poses corresponding to photographs containing the selected point are clustered, the visualization client 116 determines the cluster 802 with the highest number of camera poses. Within that cluster 802, the visualization client 116 selects the photograph having the camera pose closest to the mean of the n dimensions used to cluster the camera poses. For example, as further shown in FIG. 8, the visualization client 116 may select the photograph corresponding to the view frustum 604C in the cluster 802 as the representative photograph for which to display the thumbnail image 306.

In another embodiment, the visualization client 116 may provide the user with the ability to select which thumbnail image 306 to show. For example, the user may "scrub" the mouse or use the scroll-wheel to cycle through the thumbnail images 306A-306C for each photograph corresponding to photographs within the selected cluster 802. Or the user may use these interactions to cycle through thumbnail images 306A-306C from among all of the photographs in the visual reconstruction 112 containing the feature corresponding to the selected point. According to a further embodiment, the visualization client 116 may show an exploded view of thumbnail images 306 for multiple photographs linked to the selected point.

Figure 9:
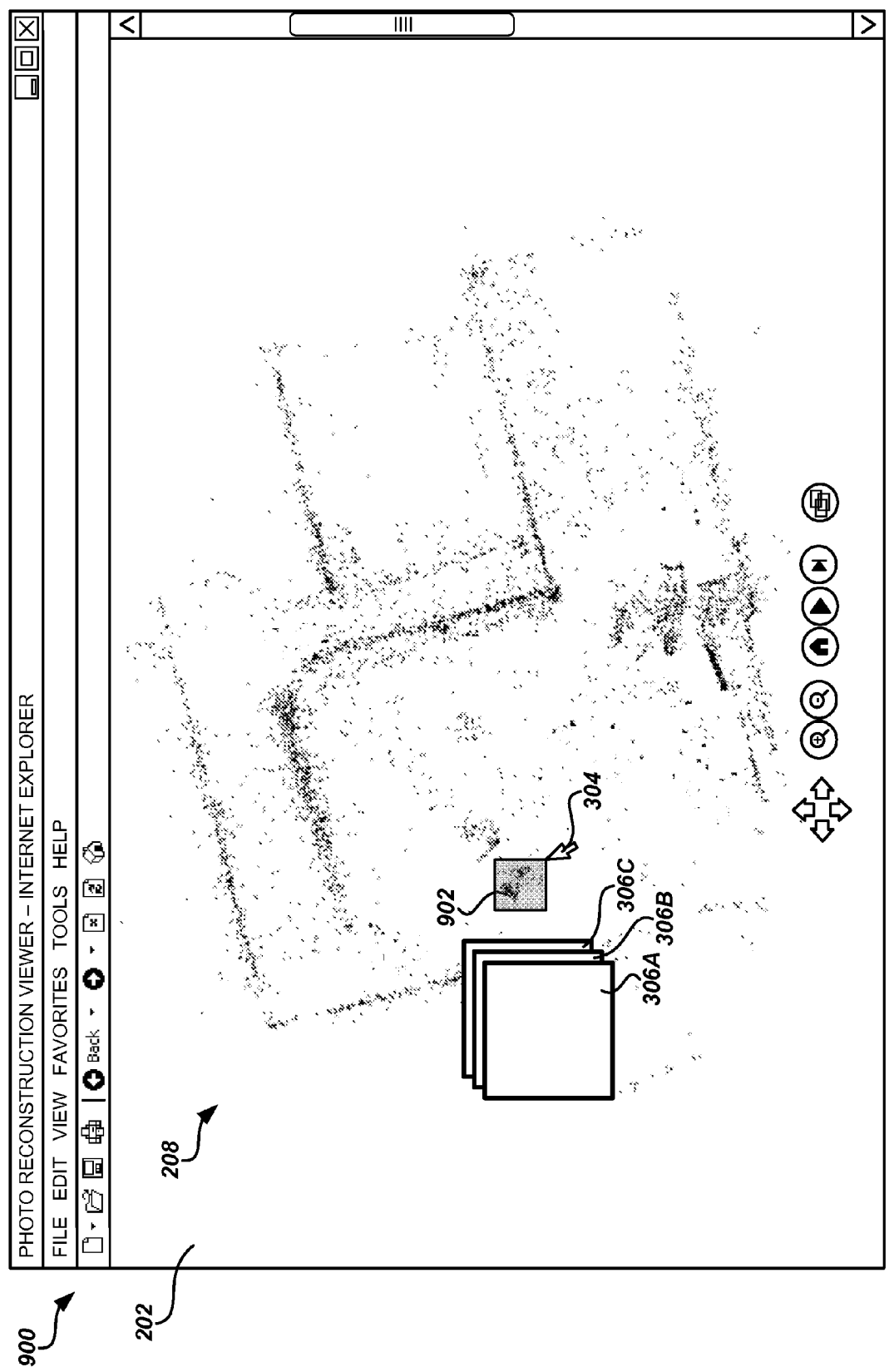
FIG. 9 is a display diagram showing another user interface for providing object-based interaction with the top-down map, according to another embodiment presented herein.

FIG. 9 shows a further user interface 900 providing an object-based interaction technique involving the selection of multiple points on the top-down map 208 comprising an object, according to another embodiment. The visualization client 116 may allow the user to select a group of points that make up an object of interest. For example, the user may utilize the selection control 304 to draw a "lasso" or selection box 902 around the group of points. Alternatively, the user may be able to draw a region around the desired group of points, or the selection control 304 may be displayed as a box or circle that encompasses the points of interest. Or, the user may draw a line or "stroke" across a subset of points, and the visualization client 116 may use a nearest-clustering algorithm to select the group of points.

It will be appreciated that other methods beyond those described herein may be utilized by the user to select a group of points on the top-down map 208. It is intended that this application cover all such methods of selecting a group of points. Once a group of points are selected, the visualization client 116 may use the algorithms described above to determine the representative photograph or photographs from the collection of photographs 104 for which to display thumbnail images 306A-306C for the selected group of points.

In another embodiment, every position, or pixel, in the top-down map 208 may correspond to a particular photograph in the visual reconstruction 112, not just the points in the 3-D point cloud 108. In order to accomplish this, the visualization client 116 may pre-compute a "heatmap" of the contribution of the coverage for each camera in the visual reconstruction 112. For each camera, the visualization client 116 renders its extent into an accumulation buffer, where those pixels that are inside the coverage of the camera accumulate in value. When the user hovers the mouse over a particular pixel in the top-down map 208, the visualization client 116 can quickly determine all cameras that made a contribution to that position. Determination of the representative photograph for which to display a thumbnail image 306 may then use one or more of the algorithms described above to select from the contributing cameras in the visual reconstruction 112.

Another object-based interaction technique involves the user specifying both a selection of an object, a point, or a group of points, as well as a scale and direction, according to a further embodiment. For example, once the user selects a group of points comprising an object, as described above in regard to FIG. 9, the visualization client 116 may then present the user with the virtual camera control 402 described above in regard to FIG. 4. The user may use the virtual camera control to select an ideal camera view in relation to the position of the object comprising the selected points on the top-down map 208. The visualization client 116 may then use one or more of the algorithms described above to determine the representative photograph from the visual reconstruction 112 containing the selected object and most closely matching the selected ideal camera view.

Figure 10:
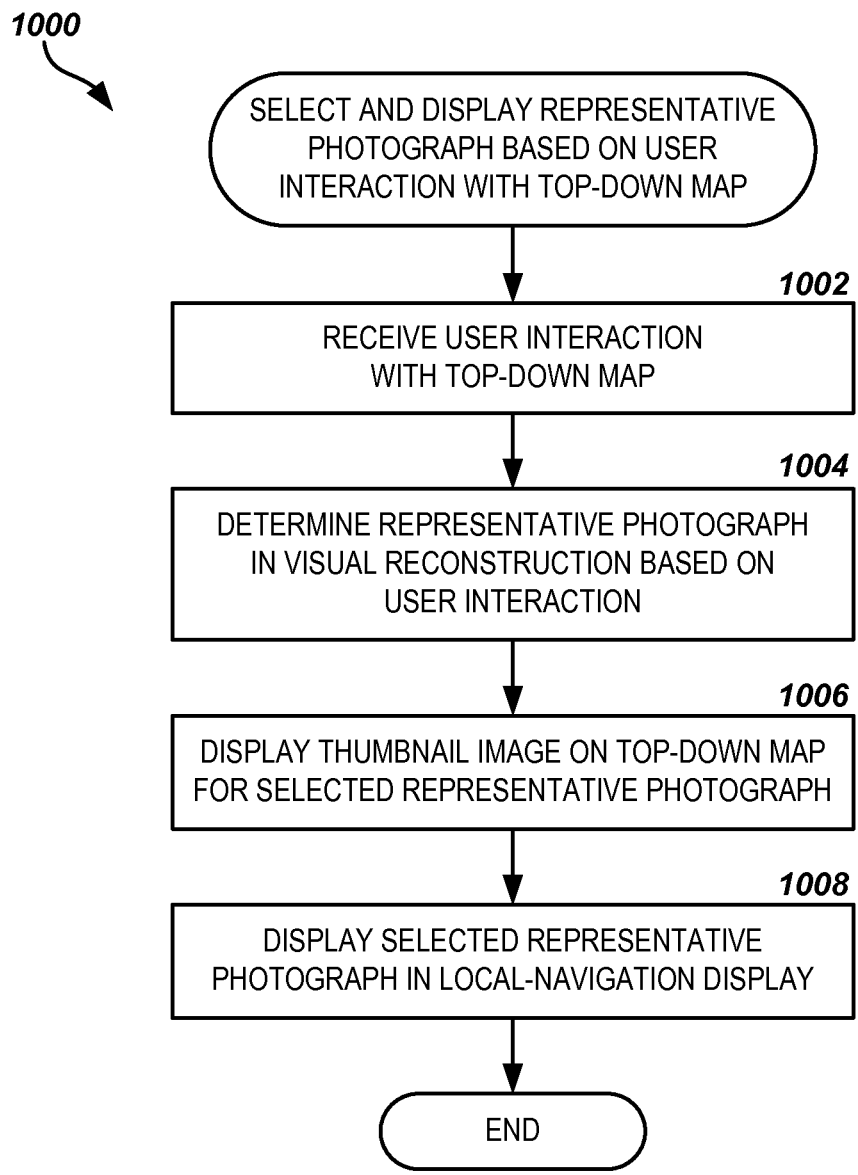
FIG. 10 is a flow diagram showing methods for selecting and displaying representative photographs based on user interactions with a top-down map of a reconstructed structure within a 3-D scene, according to embodiments described herein.

Referring now to FIG. 10, additional details will be provided regarding the embodiments presented herein. It should be appreciated that the logical operations described with respect to FIG. 10 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 10 illustrates a routine 1000 for selecting and displaying representative photographs based on user interactions with the top-down map 208, in the manner described above. According to embodiments, the routine 1000 may be performed by the visualization client 116 described above in regard to FIG. 1. It will be appreciated that the routine 1000 may also be performed by other modules or components executing on the server computer 102 and/or user computer 118, or by any combination of modules and components.

The routine 1000 begins at operation 1002, where the visualization client 116 receives a user interaction with the top-down map 208. The user interaction may be a camera-based interaction, as described above in regard to FIGS. 3 and 4, or the user interaction may be an object-based interaction, as described above in regard to FIGS. 5, 6, and 9. For example, the visualization client 116 may receive an indication that the user is hovering the selection control 304 over a point or group of points on the top-down map 208.

From operation 1002, the routine 1000 proceeds to operation 1004, where the visualization client 116 determines a representative photograph in the visual reconstruction 112 based on the received user interaction. The method used by the visualization client 116 for determining the representative photograph may vary based on the type of the user interaction received. For example, if the user interaction involves the selection of a camera pose 302, an object 502, or a panorama 504 overlaid on the top-down map 208, the visualization client 116 may select the photograph corresponding to the selected element in the visual reconstruction 112 as the representative photograph, as described above in regard to FIGS. 3 and 5. If the user interaction involves the selection of an ideal camera view or a point or group of points on the top-down map 208, the visualization client 116 may determine the representative photograph using one of the algorithms described above in regard to FIGS. 4, 7, and 8.

The routine 1000 proceeds from operation 1004 to operation 1006, where the visualization client 116 may display a thumbnail image 306 of the selected representative photograph on the top-down map 208, according to embodiments. The position of the thumbnail image 306 on the top-down map 208 may be determined using a number of different techniques. For example, the thumbnail image 306 may be placed near the selected object or point on the top-down map 208. Alternatively, the thumbnail image 306 may be placed near the position of the camera that captured the representative photograph or along a projected line in the direction of the camera view, as shown in FIG. 3. In one embodiment, the visualization client 116 may select more than one representative photograph based on the user interaction, and provide the user with the ability to select which thumbnail image 306 to show. For example, the user may "scrub" the mouse or use the scroll-wheel to cycle through the thumbnail images 306A-306C for each selected representative photograph, as shown in FIG. 8.

From operation 1006, the routine 1000 proceeds to operation 1008, where the visualization client 116 causes the representative photograph to be displayed in the local-navigation display 204. This may be performed based on further interaction from the user, such as the user clicking a button on the mouse, as described above in regard to FIG. 3. In a split-screen view, displaying the representative photograph in the local-navigation display 204 may involve shifting the local-navigation display to the position of the corresponding photograph within the visual reconstruction 112. In the modal view, this may require transitioning the display from the modal view of the top-down map 208 to the local-navigation display 204 in such a way as to allow a user to retain a visual orientation of the camera position in the transition from one view to the other. From operation 1008, the routine 1000 ends.

Figure 11:
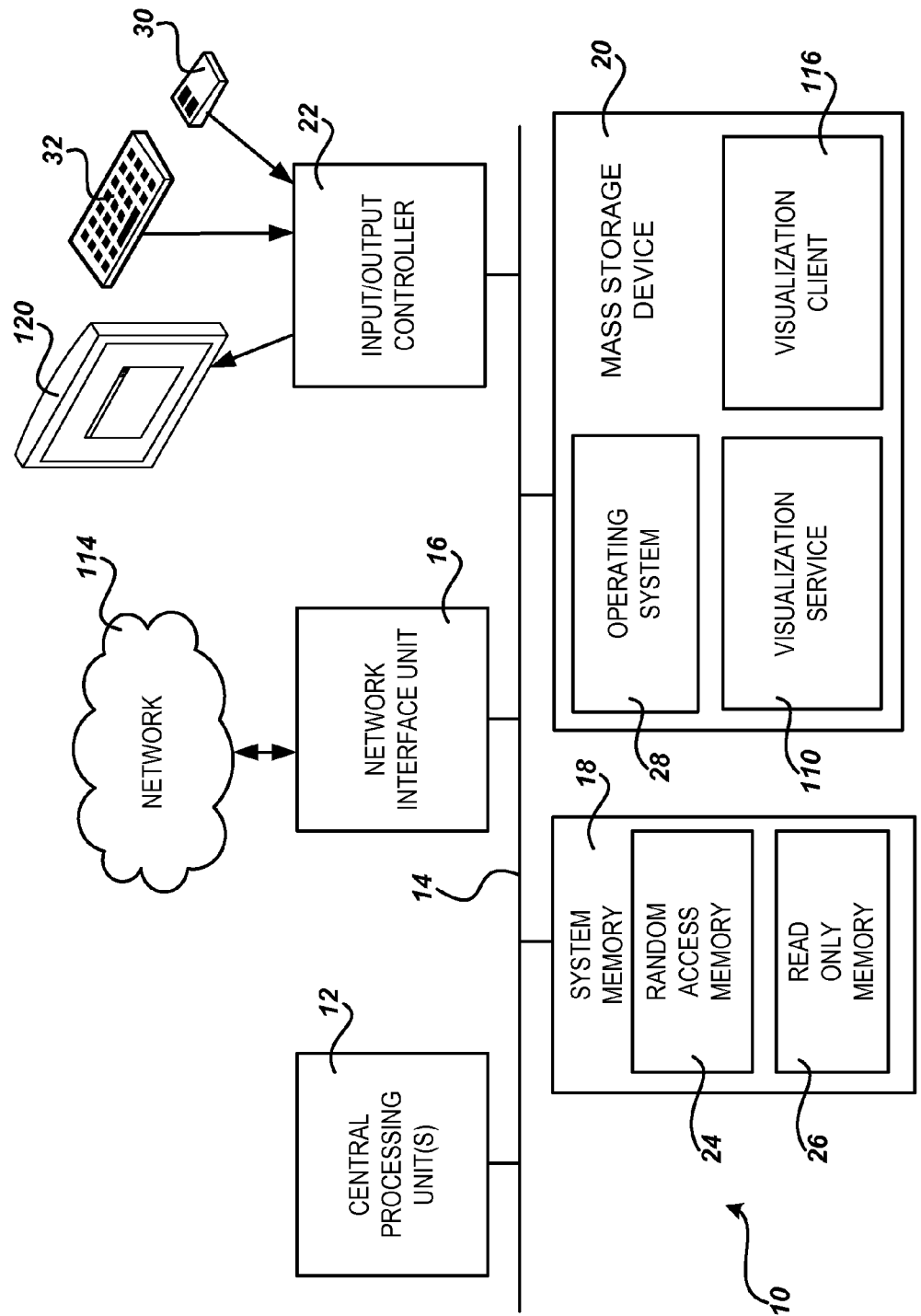
FIG. 11 is a block diagram showing an illustrative computer hardware and software architecture for a computing system capable of implementing aspects of the embodiments presented herein.

FIG. 11 shows an example computer architecture for a computer 10 capable of executing the software components described herein for providing user interfaces through which a user may interact with a top-down map of a reconstructed structure within a 3-D scene, in the manner presented above. The computer architecture shown in FIG. 11 illustrates a conventional computing device, PDA, digital cellular phone, communication device, desktop computer, laptop, or server computer, and may be utilized to execute any aspects of the software components presented herein described as executing on the user computer 118, server computer 102, or other computing platform.

The computer architecture shown in FIG. 11 includes one or more central processing units ("CPUs") 12. The CPUs 12 may be standard central processors that perform the arithmetic and logical operations necessary for the operation of the computer 10. The CPUs 12 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 18, including a random access memory ("RAM") 24 and a read-only memory 26 ("ROM"), and a system bus 14 that couples the memory to the CPUs 12. A basic input/output system containing the basic routines that help to transfer information between elements within the computer 10, such as during startup, is stored in the ROM 26. The computer 10 also includes a mass storage device 20 for storing an operating system 28, application programs, and other program modules, which are described in greater detail herein.

The mass storage device 20 is connected to the CPUs 12 through a mass storage controller (not shown) connected to the bus 14. The mass storage device 20 provides non-volatile storage for the computer 10. The computer 10 may store information on the mass storage device 20 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 10 may store information to the mass storage device 20 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 10 may further read information from the mass storage device 20 by detecting the physical states or characteristics of one or more particular locations within the mass storage device.

As mentioned briefly above, a number of program modules and data files may be stored in the mass storage device 20 and RAM 24 of the computer 10, including an operating system 28 suitable for controlling the operation of a computer. The mass storage device 20 and RAM 24 may also store one or more program modules. In particular, the mass storage device 20 and the RAM 24 may store the visualization service 110 and visualization client 116, both of which were described in detail above in regard to FIG. 1. The mass storage device 20 and the RAM 24 may also store other types of program modules or data.

In addition to the mass storage device 20 described above, the computer 10 may have access to other computer-readable media to store and retrieve information, such as program modules, data structures, or other data. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 10.

The computer-readable storage medium may be encoded with computer-executable instructions that, when loaded into the computer 10, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 10 by specifying how the CPUs 12 transition between states, as described above. According to one embodiment, the computer 10 may have access to computer-readable storage media storing computer-executable instructions that, when executed by the computer, perform the routine 1000 for providing user interactions with a top-down map of a reconstructed structure within a 3-D scene, described above in regard to FIG. 10.

According to various embodiments, the computer 10 may operate in a networked environment using logical connections to remote computing devices and computer systems through a network 114. The computer 10 may connect to the network 114 through a network interface unit 16 connected to the bus 14. It should be appreciated that the network interface unit 16 may also be utilized to connect to other types of networks and remote computer systems.

The computer 10 may also include an input/output controller 22 for receiving and processing input from a number of input devices, including a mouse 30, a keyboard 32, a touchpad, a touch screen, an electronic stylus, or other type of input device. Similarly, the input/output controller 22 may provide output to the display device 120, such as a computer monitor, a flat-panel display, a digital projector, a printer, a plotter, or other type of output device. It will be appreciated that the computer 10 may not include all of the components shown in FIG. 11, may include other components that are not explicitly shown in FIG. 11, or may utilize an architecture completely different than that shown in FIG. 11.

Based on the foregoing, it should be appreciated that technologies for providing user interfaces through which a user may interact with a top-down map of a reconstructed structure within a 3-D scene are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus comprising:
   a processor; and
   a memory configured to store computer-executable instructions that, when executed by the processor, cause the processor to
   compute a three-dimensional (3-D) point cloud representing one of a structure or a scene by locating a plurality of recognizable features that appear in two or more photographs of a collection of digital photographs by calculating positions of the plurality of recognizable features in space using one of location, perspective and visibility or obscurity of the plurality of recognizable features of each photograph of the two or more photographs, each position of the plurality of recognizable features corresponding to a point in the 3-D point cloud, generate a two-dimensional top-down map by projecting points of the 3-D point cloud into a 2-D plane, and representing each projected point of the 3-D point cloud in the top-down map with a dot, the top-down map providing a visual reconstruction of one of the structure or the scene computed from the 3-D point cloud, receive a user interaction with the top-down map, the user interacting specifying a feature in the 3-D point cloud represented by at least one dot in the top-down map, determine a representative digital photograph from the collection of digital photographs based on the received user interaction, the representative digital photograph corresponding to at least a located recognizable feature associated the received user interaction, and display an image of the representative digital photograph being overlaid on the top-down map representing the one of the structure or the scene.

2. The apparatus of claim 1, wherein displaying the image of the representative digital photograph comprises displaying a thumbnail image.

3. The apparatus of claim 1, wherein the user interaction further comprises a selection of a camera pose indicator displayed on the top-down map, the camera pose indicator including a position of and an orientation of a camera used to capture a digital photograph from the collection of digital photographs, and wherein determining the representative digital photograph from the collection of digital photographs comprises selecting a digital photograph corresponding to the selected camera pose.

4. The apparatus of claim 1, wherein the user interaction further comprises a selection of an ideal camera view on the top-down map, and wherein determining the representative digital photograph from the collection of digital photographs comprises selecting a digital photograph corresponding to a camera pose most closely matching the ideal camera view, the camera pose including a position of and an orientation of a camera used to capture a digital photograph from the collection of digital photographs.

5. The apparatus of claim 1, wherein the user interaction further comprises a selection of a reconstruction element, and wherein determining the representative digital photograph from the collection of digital photographs comprises selecting a digital photograph corresponding to the selected reconstruction element.

6. The apparatus of claim 1, wherein the user interaction further comprises a selection of a point in the 3-D point cloud, and wherein determining the representative digital photograph from the collection of digital photographs further comprises selecting a digital photograph corresponding to a camera pose having a closest proximity to the selected point from among the camera poses being similarly centered on the selected point, the camera pose including a position of and an orientation of a camera used to capture a digital photograph from the collection of digital photographs.

7. The apparatus of claim 1, wherein the user interaction further comprises a selection of a point in the 3-D point cloud, and wherein determining the representative digital photograph from the collection of digital photographs further comprises selecting a photograph corresponding to a camera pose closest to the mean position and orientation of a cluster of camera poses being similar in position and in orientation, the camera pose including a position of and an orientation of a camera used to capture a digital photograph from the collection of digital photographs.

8. The apparatus of claim 1, wherein determining the representative digital photograph from the collection of digital photographs further comprises selecting multiple digital photographs related to the user interaction, and wherein the user interaction further determines which ones of the multiple digital photographs to display.

9. The apparatus of claim 1, wherein the user interaction comprises a selection of a group of points in the 3-D point cloud, and wherein determining the representative digital photograph from the collection of digital photographs comprises selecting a digital photograph related to an object comprising the selected group of points.

10. A computer-implemented method comprising:

computing, on a computing device, a three-dimensional (3-D) point cloud representing one of a structure or a scene by locating a plurality of recognizable features that appear in two or more photographs of a collection of digital photographs by calculating positions of the plurality recognizable features in space using one of location, perspective and visibility or obscurity of the plurality of recognizable features of each photograph of the two or more photographs, each position of the plurality of recognizable features corresponding to a point in the 3-D point cloud, generating, on the computing device, a two-dimensional top-down map by projecting points of the 3-D point cloud into a 2-D plane, and representing each projected point of the 3-D point cloud in the top-down map with a dot, the top-down map providing a visual reconstruction of one of the structure or the scene computed from the 3-D point cloud, receiving, on the computing device, a selection of a feature in the 3-D point cloud represented by at least one dot in the top-down map;

determining, by the computing device, a representative digital photograph from the collection of digital photographs based on the received user interaction; and displaying a thumbnail image of the representative digital photograph overlaid on the top-down map representing the one of the structure or the scene.

11. The computer-implemented method of claim 10, further comprising displaying the representative digital photograph in an associated local-navigation display.

12. The computer-implemented method of claim 10, wherein determining the representative digital photograph from the collection of digital photographs further comprises selecting, by the computing device, a photograph corresponding to a camera pose having a closest proximity to the selected point from among the camera poses being similarly centered on the selected point, the camera pose including a position of and an orientation of a camera used to capture a digital photograph from the collection of digital photographs.

13. The computer-implemented method of claim 10, wherein determining the representative digital photograph from the collection of digital photographs further comprises selecting, by the computing device, a photograph corresponding to a camera pose closest to the mean position and orientation of a cluster of camera poses being similar in position and in orientation, the camera pose including a position of and an orientation of a camera used to capture a digital photograph from the collection of digital photographs.

14. The computer-implemented method of claim 10, wherein determining the representative digital photograph from the collection of digital photographs further comprises selecting, by the computing device, multiple photographs related to the selected point, and
  wherein a user interaction determines which ones of the multiple digital photographs to display as the thumbnail image.

15. The computer-implemented method of claim 10, further comprising:
  receiving, by the computing device, a selection of a group of points in the 3-D point cloud; and
  determining, by the computing device, the representative digital photograph from the collection of digital photographs related to an object comprising the selected group of points.

16. A computer-implemented system comprising:
  a server computer executing a spatial processing engine that generates a three-dimensional (3-D) point cloud representing one of a structure or a scene by locating a plurality of recognizable features that appear in two or more photographs of a collection of digital photographs by calculating positions of the plurality recognizable features in space using one of location, perspective and visibility or obscurity of the plurality of recognizable features of each photograph of the two or more photographs, each position of the plurality of recognizable features corresponding to a point in the 3-D point cloud, and generates a two-dimensional top-down map by projecting points of the 3-D point cloud into a 2-D plane, and represents each projected point of the 3-D point cloud in the top-down map with a dot, the top-down map providing a visual reconstruction of one of the structure or the scene computed from the 3-D point cloud;
  a visualization service executing on the server computer and configured to send the top-down map providing the visual reconstruction of one of the structure or the scene to a visualization client; and
  the visualization client executing on a user computer and configured to
    receive and display the top-down map providing the visual reconstruction on a display device connected to the user computer,
    receive a user interaction with the top-down map providing the visual reconstruction of one of the structure or the scene,
    determine a representative digital photograph from the collection of digital photographs based on the received user interaction, the representative digital photograph corresponding to at least a located recognizable feature associated with the received user interaction, and
    display a thumbnail image of the representative digital photograph overlaid on the top-down map providing the visual reconstruction of the one of the structure or the scene.

17. The system of claim 16, wherein the visualization client is further configured to display the representative digital photograph in an associated local-navigation display of the visual reconstruction on the display device.

18. The system of claim 16, wherein the user interaction further comprises a camera-based interaction, and
  wherein determining the representative digital photograph based on the user interaction further comprises:
  determining a camera pose indicator displayed on the top-down map of the visual reconstruction of one the structure or the scene most related to the camera-based interaction, the camera pose indicator including a position of and an orientation of a camera used to capture a digital photograph from the collection of digital photographs; and
  selecting the photograph corresponding to the camera pose indicator as the representative digital photograph.

19. The system of claim 16, wherein the user interaction further comprises an object-based interaction, and
  wherein determining the representative photograph based on the user interaction further comprises:
  determining one or more digital photographs from the visual reconstruction of one of the structure or the scene most related to the object-based interaction; and
  selecting the one or more digital photographs as the representative digital photographs.

* * * * *